(No Model.) 2 Sheets—Sheet 1.
G. E. WILSON.
ROPE DRIVE MECHANISM.
No. 601,110. Patented Mar. 22, 1898.
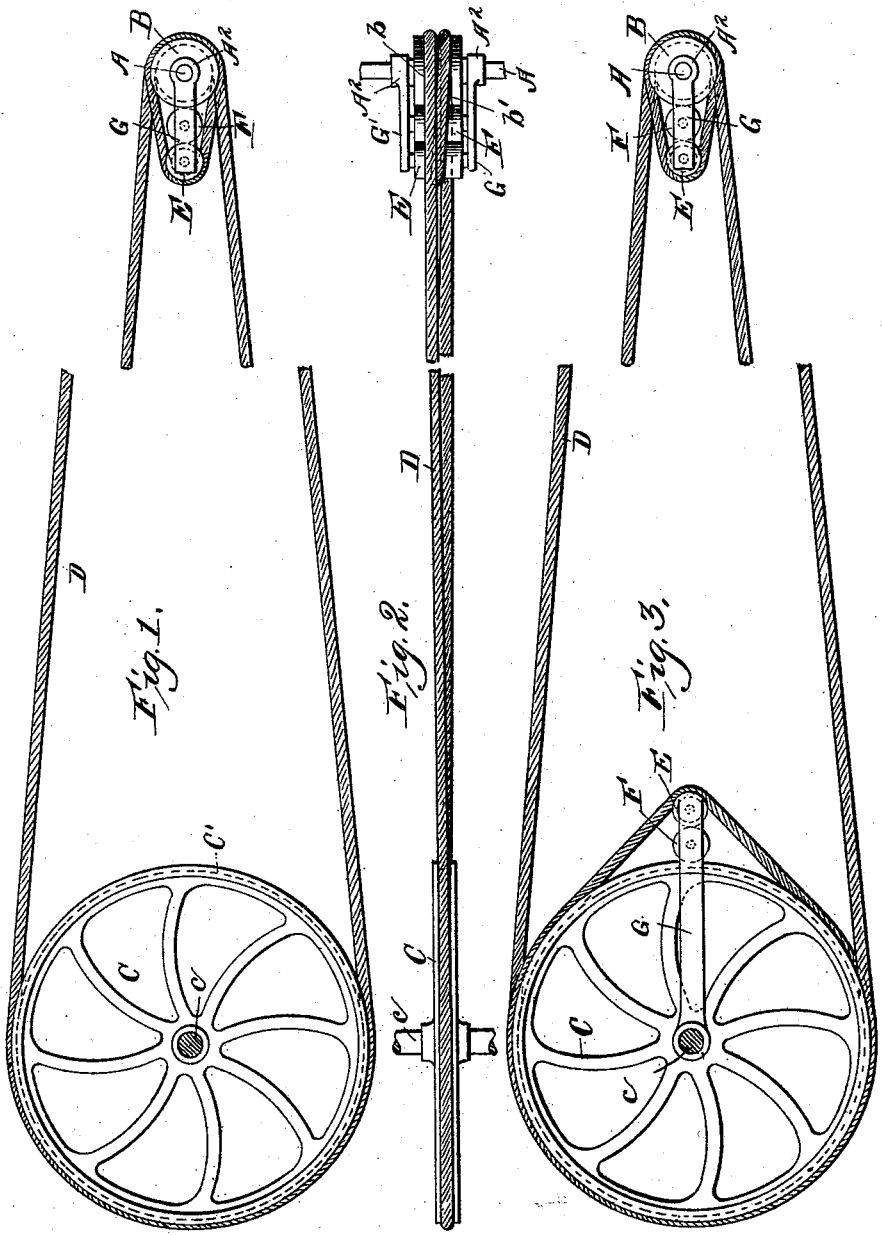
Witnesses:
Wm. H. Edwards
Arthur L. Bryant
Inventor
George E. Wilson
By H. H. Bliss
Atty.

(No Model.) 2 Sheets—Sheet 2.
G. E. WILSON.
ROPE DRIVE MECHANISM.
No. 601,110. Patented Mar. 22, 1898.
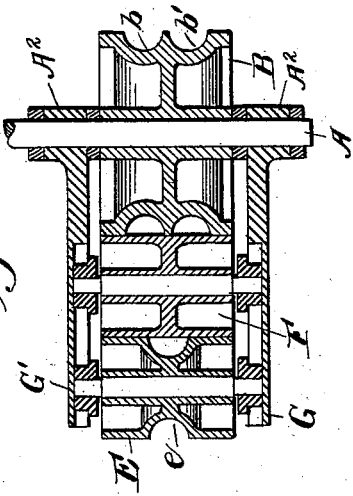
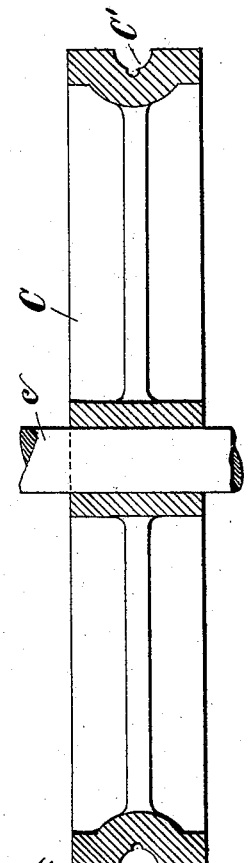
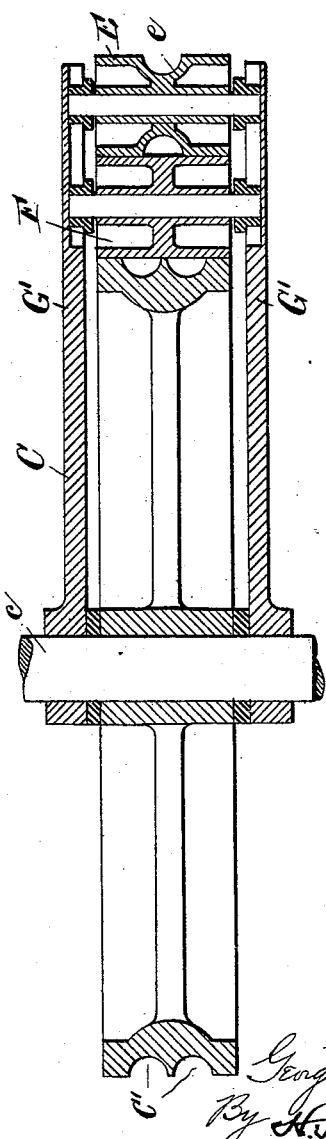
Witnesses
Wm. H. Edwards
Arthur L. Bryant
Inventor
George E. Wilson
By H. H. Bliss, Atty.
THE NORRIS PETERS CO., PHOTO-LITHO., WASHINGTON, D. C.

UNITED STATES PATENT OFFICE.

GEORGE E. WILSON, OF STILLWATER, MINNESOTA.

ROPE DRIVE MECHANISM.

SPECIFICATION forming part of Letters Patent No. 601,110, dated March 22, 1898.

Application filed February 16, 1897. Serial No. 623,647. (No model.)

*To all whom it may concern:*

Be it known that I, GEORGE E. WILSON, a citizen of the United States, residing at Stillwater, in the county of Washington and State of Minnesota, have invented certain new and useful Improvements in Rope Drive Mechanism; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a side elevation illustrating my improvements. Fig. 2 is a plan view. Fig. 3 is a side elevation showing a slightly-modified arrangement of parts. Fig. 4 is a section through the driving-wheel illustrated in Fig. 1. Fig. 5 is a sectional view of the driven wheel and coacting parts. Fig. 6 is a sectional view through the driving-wheel when the parts are related as shown in Fig. 3.

In the drawings, A designates the cylinder-shaft of a thresher or other power-transmitting shaft, on which is secured a driven pulley B. Power is transmitted from a power wheel or pulley C on a suitable driving-shaft $c$ by means of an endless rope or cable D.

One of the objects of the present invention, which is particularly applicable for use in connection with threshing-machines, is to provide an arrangement of parts whereby a relatively small rope or cable may be substituted for the large, heavy, and expensive belt commonly employed for transmitting motion from the engine to the cylinder-shaft of a thresher.

In order that there may be no diminution in the power and speed of the driven pulley caused by substituting such a relatively narrow and small power-transmitter for the wide belt commonly employed, I provide means for increasing the frictional surface which the rope or cable engages with said pulley without wrapping or winding the rope or cable entirely around the pulley.

The power-wheel C in the embodiment of my invention illustrated in Figs. 1, 2, and 4 is provided with a peripheral groove $C'$, preferably of the cross-sectional form shown, so that a relatively large frictional surface will be provided for the cable or rope D.

The driven wheel or pulley B has formed therein two parallel peripheral grooves $b$ $b'$. The pulley B is relatively small, and it is not practical to wrap or wind the driving-cable D thereon, because the coils on the smooth surface of an ordinary pulley will move or slip transversely of such surface when power is applied to the cable; but the relatively small portion of the surface of the driven pulley which would be engaged by the narrow cable would not be sufficient to produce the desired speed. Therefore I have provided means for increasing the frictional surface with which the rope or cable will engage and by which the power of the pulley B will be materially increased.

E designates a pulley, hereinafter designated and referred to as a "tension-pulley," which is mounted in suitable bearings and arranged between the driving-wheel C and the driven wheel B. This tension-wheel is also provided with a peripheral groove, and the cable or rope D passes first from the driving pulley or wheel C into the groove $b$ in the driven pulley and from said groove into the groove $e$ in the tension-pulley and then to the groove $b'$ in the pulley B and from there back to the main power-wheel.

F designates a friction drum or pulley which is mounted between and contacts with the peripheries of both the driven pulley B and the tension-pulley E.

Both the tension-pulley E and the friction-drum F have their bearings mounted and arranged to move longitudinally, they being shown as fitted to guides G G'. These guides may be supported in any suitable manner. In case the above-described parts are employed to drive the cylinder-shaft of a threshing-machine said guides can be secured directly to the side walls of the thresher; but in the drawings I have illustrated the manner of supporting the said guides which I prefer to employ in most cases—that is, the said guides G G' are formed with bearings $A^2$, which are mounted on the shaft A. By this construction the tension-pulley and friction-drum are adapted to yield vertically under the influence of any sudden force from the driving-cable—that is, the guides G G' can rock vertically about the shaft A as an axis and thereby relieve the bearings of the tension-pulley of the strain which would be experienced when some inequality in the surface of the rapidly-traveling cable comes into contact with the periphery of said pulley.

My improvements are particularly applicable to the driving of the cylinders of a threshing-machine. The engine by which the power for driving the threshing mechanism is produced is placed at a relatively remote point from the thresher, and heretofore it has been considered necessary to employ a wide, heavy, and expensive belt to connect the engine drive-wheel with a pulley or wheel, as at B, on the cylinder-shaft of the thresher, and great care is necessary to place the two machines so that the driving and driven pulley shall be in the same straight line; but by my construction I am enabled to dispense with the said expensive and cumbersome driving-belt and employ a cheap and relatively small cable. Such a cable, however, is likely to have various inequalities in its surface, be of greater diameter at some points in its length than at others, &c., and as the cable must be driven at a high rate of speed to impart the necessary power to the cylinder-shaft the tension-pulley will be subjected to sudden increases in force; but by supporting said pulley in the manner described, so that it can vibrate to a limited extent about the axis of the shaft A, there will be no danger of the bearings of the pulley being strained or damaged. The grooves in the tension and driven pulleys are made relatively wide, so that the rope or cable will not be rendered ineffective in case there is a slight inaccuracy in alinement between the main power or driving wheel C and the driven wheel B.

From the description and the drawings it will be seen that without increasing the width or size of the driven pulley B, I am enabled by the construction herein to drive said pulley at a high speed and that the cable or rope will be maintained taut at all times. By my construction also a large part of the strain of the cable or rope is taken off from the bearings of the shaft A.

As shown in Figs. 3 and 6, a tension-pulley and friction-drum similar to those above described may be arranged adjacent to and adapted to act with the main driving wheel or pulley C.

I am aware that prior to my invention it has been proposed to drive a shaft by means of suitable pulleys connected by a belt with power mechanism and having frictional engagement with the shaft; also, that it has been proposed to arrange such driving-pulleys on opposite sides of the shaft to be driven, whereby the power will be uniformly applied to the shaft at diametrically opposite points and the shaft be so held against vibration that carefully-fitted and expensive bearings need not be employed; but my improvements are clearly distinguished from such a construction as that just referred to. In my construction the power from the driving-wheel is taken by a relatively narrow rope or cable directly to a pulley mounted on the power-distributing shaft, and in order that the frictional surface with which the driving rope or cable engages said pulley may be increased I arrange a friction-drum between such pulley and a supplemental tension-pulley supported at one side of the driven pulley and having a direct engagement with the power-cable.

What I claim is—

1. In a power mechanism, the combination of a driving-wheel, a driven pulley, an endless power-transmitter connecting said driving-wheel and driven pulley, and a supplemental pulley adapted to engage with said endless transmitter at points between said driving-wheel and driven pulley and supported to move bodily, independently of either the driving-wheel or driven pulley, toward and from said wheel or pulley, substantially as set forth.

2. In a power mechanism, the combination of a revoluble driving member, a revoluble driven member, an endless power-transmitter connecting said members, and a supplemental pulley adapted to engage with the power-transmitter and mounted to move, independently of the said driving and driven members, bodily in an arc concentric with the axis of one of said main members, and also toward and from said axis, substantially as set forth.

3. In a power mechanism, the combination of a driving-wheel, a driven pulley having two peripheral grooves formed therein, an endless power-transmitter connecting said driving-wheel and driven pulley and having a portion fitted in each of the grooves in the said driven pulley, and a supplemental pulley having a peripheral groove receiving a portion of the endless power-transmitter intermediate of the portions of said transmitter engaging with the driven pulley, said supplemental pulley being mounted to move bodily toward and from the driven pulley, independently of any movement of said driven pulley, substantially as set forth.

4. In a rope or cable driven power mechanism, the combination of a main driving-wheel, C, the driven wheel, B, the tension pulley or wheel arranged to automatically move to and from said driven wheel, an endless cable connecting all of said wheels and a friction-drum interposed between the tension-wheel and the driven pulley, substantially as set forth.

5. In a cable or rope drive mechanism, the combination of a driving-wheel, a driven pulley, guides supported at the axis of the driven pulley, a tension-pulley mounted in bearings fitted to said guides to move toward and from the driven pulley a friction-drum mounted in bearings fitted to said guides, between the tension-pulley and the driven wheel, and an endless cable extending from the driving-wheel around the driven wheel and the tension-pulley, substantially as set forth.

6. The combination of a driven wheel, a driving-wheel, a tension-pulley arranged between the driving-wheel and driven wheel, a bearing for the tension-pulley adapted to vibrate about the axis of one of said wheels, a friction-drum mounted to vibrate with said tension-pulley and contacting therewith and with one of said wheels, and an endless power-transmitting connection between the two wheels and the tension-pulley, substantially as set forth.

7. The combination of a driving-wheel, a driven wheel, a tension-pulley arranged between said wheels and adapted to vibrate in an arc concentric with one of them, a friction-drum mounted between and in contact with said pulley and one of said wheels, and an endless power-transmitter connecting said wheels and said pulley, substantially as set forth.

8. The combination of a driving-wheel, a driven wheel, arms supported to vibrate about the axis of one of said wheels, a tension-pulley supported by said arms, a friction-drum supported by said arms having peripheral contact with the tension-pulley and one of said wheels, and an endless power-transmitter connecting said wheels and pulley, substantially as set forth.

9. The combination of a driving-wheel, a driven wheel, arms supported to vibrate about the axis of one of said wheels, and extending toward the other wheel, a tension-pulley supported in bearings carried by said arms and adapted to move longitudinally thereof, a friction-drum supported in bearings carried by said arms, and contacting with the said pulley and one of the wheels, and an endless power-transmitter connecting said wheels and the pulley, substantially as set forth.

In testimony whereof I affix my signature in presence of two witnesses.

GEORGE E. WILSON.

Witnesses:
  A. J. HOLM,
  MARIETTA CAPRON.